US011549353B2

(12) United States Patent
Ahmed et al.

(10) Patent No.: US 11,549,353 B2
(45) Date of Patent: Jan. 10, 2023

(54) PROVIDING SEISMIC SECTIONS FOR DRILLING SYSTEMS

(71) Applicant: Saudi Arabian Oil Company, Dhahran (SA)

(72) Inventors: Ferhan Y. Ahmed, Dhahran (SA); Mohammed S. Mubarak, Dhahran (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1000 days.

(21) Appl. No.: 16/275,627

(22) Filed: Feb. 14, 2019

(65) Prior Publication Data
US 2020/0263529 A1 Aug. 20, 2020

(51) Int. Cl.
E21B 44/00 (2006.01)
E21B 7/06 (2006.01)
(Continued)

(52) U.S. Cl.
CPC .............. E21B 44/00 (2013.01); E21B 7/06 (2013.01); E21B 41/0092 (2013.01);
(Continued)

(58) Field of Classification Search
CPC ........ E21B 44/00; E21B 7/06; E21B 41/0092; E21B 47/0224; G01V 1/288; G01V 1/364; G01V 2200/16; G01V 2210/1295; G01V 2210/1425; G01V 2210/72; G01V 2210/3246; G01V 2210/56
(Continued)

(56) References Cited

U.S. PATENT DOCUMENTS

2010/0097888 A1  4/2010 Neelamani et al.
2017/0075000 A1* 3/2017 Dusterhoft ............... G01V 1/42

FOREIGN PATENT DOCUMENTS

WO      2014004109         1/2014
WO   WO-2014004109 A1 *  1/2014   ............... G01V 1/28
(Continued)

OTHER PUBLICATIONS

A. Guitton1 and D. J. Verschuur2 "Adaptive subtraction of multiples using the L1-norm" Geophysical Prospecting, 2004, 52, 27-38 (Year: 2002).*

(Continued)

Primary Examiner — John E Johansen
(74) Attorney, Agent, or Firm — Fish & Richardson P.C.

(57) ABSTRACT

Techniques for determining a wellbore drilling path includes identifying input seismic data associated with a subterranean zone that includes a wellbore drilling target. The input seismic data includes primary seismic events and multiple seismic events. The input seismic data is processed to remove the multiple seismic events and at least one of the primary seismic events from the input seismic data. An orthogonalization of the processed input seismic data is performed to recover the at least one primary seismic event into a seismic image of the subterranean zone that excludes at least a portion of the multiple seismic events. A wellbore path is determined from a terranean surface toward the wellbore drilling target for a drilling geo-steering system based on the seismic image of the subterranean zone.

20 Claims, 6 Drawing Sheets

(51) Int. Cl.
E21B 41/00 (2006.01)
G01V 1/28 (2006.01)
E21B 47/0224 (2012.01)
G01V 1/36 (2006.01)

(52) U.S. Cl.
CPC .......... *E21B 47/0224* (2020.05); *G01V 1/288* (2013.01); *G01V 1/364* (2013.01); *G01V 2200/16* (2013.01); *G01V 2210/1295* (2013.01); *G01V 2210/1425* (2013.01); *G01V 2210/3246* (2013.01); *G01V 2210/56* (2013.01); *G01V 2210/72* (2013.01)

(58) Field of Classification Search
USPC .......................................................... 703/10
See application file for complete search history.

(56) References Cited

FOREIGN PATENT DOCUMENTS

| WO | 2014110330 | 7/2014 | |
|---|---|---|---|
| WO | WO-2014110330 A1 * | 7/2014 | ............. G01V 1/364 |
| WO | 2015164478 | 10/2015 | |
| WO | WO-2015164478 A1 * | 10/2015 | ............... G01V 1/30 |

OTHER PUBLICATIONS

Ahmed M. Almarzoug* and Ferhan Y. Ahmed "Automatic Seismic Velocity Picking" EXPEC Advanced Research Center, Saudi Aramco (Year: 2012).*

Guitton, A. N. T. O. I. N. E., and D. J. Verschuur. "Adaptive subtraction of multiples using the L1-norm." Geophysical prospecting 52.1 (2004). pp. 27-38. (Year: 2004).*

Batany et al., "Adaptive multiple subtraction: Unification and Comparison of matching filters based on the 1q-norm and statistical independence," Geophysics vol. 81, No. 1, Jan.-Feb. 2016, 13 pages.

Berkhout and Verschuur, "Estimation of multiple scattering by iterative inversion, Part I: Theoretical considerations," Geophysics vol. 62, No. 5, Sep.-Oct. 1997, 10 pages.

Chen and Fomel, "Random noise attenuation using local signal-and-noise orthogonalization," Geophysics vol. 80, No. 6, WD1-WD9, 2015, 19 pages.

Donno, "Improving multiple removal using least-squares dip filters and independent component analysis," Geophysics vol. 76, No. 5, Sep.-Oct. 2011, 14 pages.

Donno et al., "Curvelet-based multiple prediction," Geophysics vol. 75, No. 6, Nov.-Dec. 2010, 9 pages.

Fomel, "Shaping regularization in geophysical-estimation problems," Geophysics vol. 72, No. 2, Mar.-Apr. 2007, 8 pages.

Guitton and Verschuur, "Adaptive subtraction of multiples using the L1-norm," Geophysical Prospecting, vol. 52, Issue 1, Jan. 2004, 12 pages.

Guitton, "Multiple attenuation in complex geology with a pattern-based approach," Geophysics vol. 70, No. 4, Jul.-Aug. 2005, 11 pages.

Herrmann et al., "Non-linear primary-multiple separation with directional curvelet frames," Geophysical Journal International vol. 170, Issue 2, Aug. 2007, 19 pages.

Kim et al., "Increasing signal-to-noise ratio of marine seismic data: a case study from offshore Korea," Journal of Applied Geophysics, vol. 134, Nov. 2016.

Li and Lu, "Demultiple strategy combining Radon filtering and Radon domain adaptive multiple subtraction," Journal of Applied Geophysics, vol. 103, Apr. 2014, 11 pages.

Rickett et al., "P167—Adaptive multiple subtraction with non-stationary helical shaping filters," EAGE 63rd Conference and Technical Exhibition, Jun. 11-15, 2001, 4 pages.

Spitz, "Pattern recognition, spatial predictability and subtraction of multiple events," the Leading Edge, Jan. 1999, 4 pages.

Ventosa et al., "Adaptive multiple subtraction with wavelet-base complex urary Wiener filters," Jun. 2018, published in Geophysics vol. 77, Nov.-Dec. 2012, 18 pages.

Verschuur et al., "Adaptive surface-related multiple elimination," Geophysics vol. 57, No. 9, Sep. 1992, 12 pages.

Wang, "Multiple subtraction using an expanded multichannel matching filter," Geophysics vol. 68, No. 1, Jan.-Feb. 2003, 9 pages.

Wiggins, "Multiple attenuation by explicit wave extrapolation to an interpreted horizon," the Leading Edge, Jan. 1999, 7 pages.

Xue et al., "Amplitude-perserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.

GCC Examination Report issued in Gulf Cooperation Council Appln. No. 2020-39183, dated Sep. 6, 2021, 4 pages.

PCT International Search Report and Written Opinion in International Appln. No. PCT/US2020/017703, dated May 27, 2020, 17 pages.

* cited by examiner

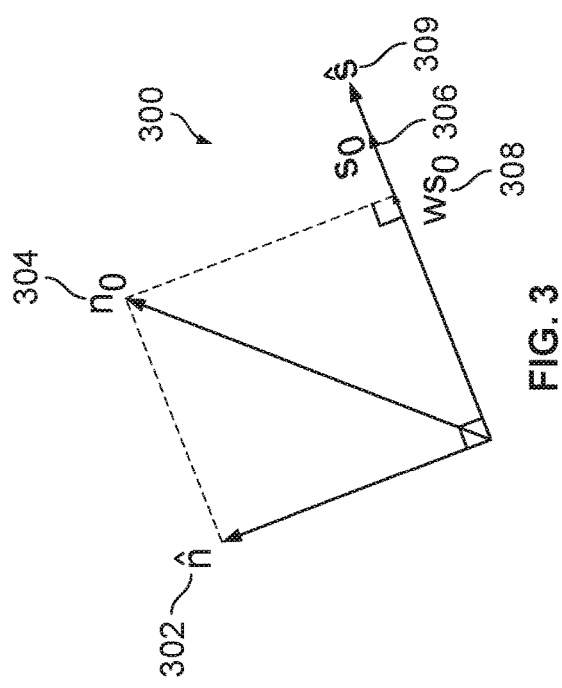
FIG. 3
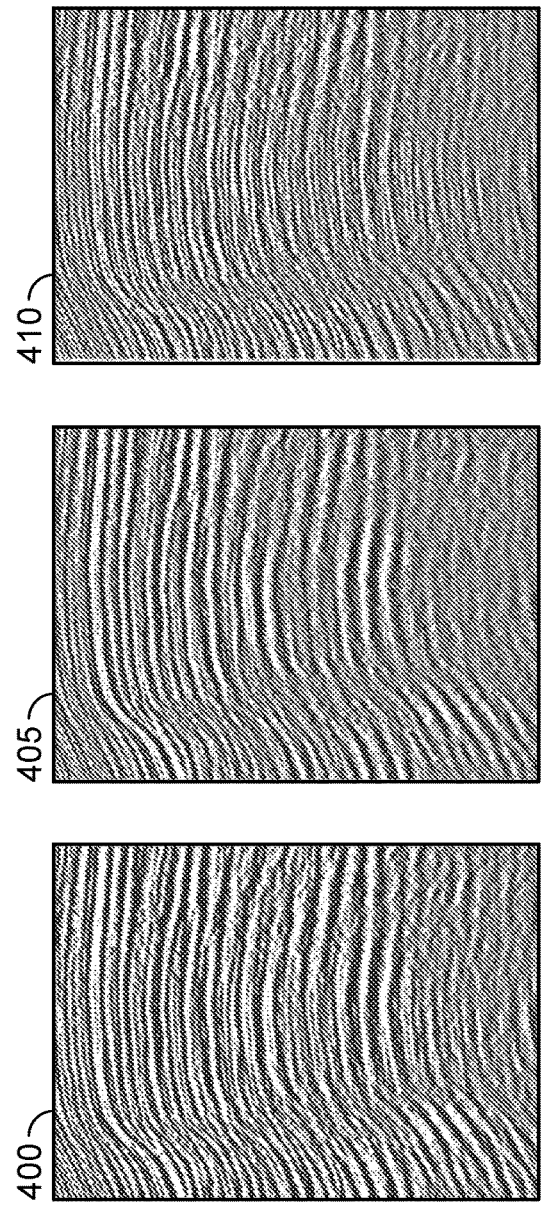
FIG. 4A
FIG. 4B
FIG. 4C

PROVIDING SEISMIC SECTIONS FOR DRILLING SYSTEMS

TECHNICAL FIELD

The present disclosure relates to systems and methods for processing seismic data for accurately drilling wellbores into subterranean formations.

BACKGROUND

Drilling operations may utilize seismic data that describes a geologic formation to plan a particular path for a wellbore. In some instances, the seismic data relied upon to plan the wellbore path may not be an accurate representation of the geologic formation under the terranean surface.

SUMMARY

In a general implementation, a computer-implemented method for determining a wellbore drilling path includes identifying with a seismic analysis system a plurality of input seismic data associated with a subterranean zone that includes a wellbore drilling target. The input seismic data includes a plurality of primary seismic events and a plurality of multiple seismic events. The method further includes processing with the seismic analysis system the plurality of input seismic data to remove the plurality of multiple seismic events and at least one of the primary seismic events from the plurality of input seismic data. The method further includes performing with the seismic analysis system an orthogonalization of the processed plurality of input seismic data to recover the at least one primary seismic event into a seismic image of the subterranean zone that excludes at least a portion of the plurality of multiple seismic events. The method further includes determining with the seismic analysis system a wellbore path from a terranean surface toward the wellbore drilling target for a drilling geo-steering system based on the seismic image of the subterranean zone.

In an aspect combinable with the general implementation, processing the plurality of input seismic data to remove the plurality of multiple seismic events and at least one of the primary seismic events from the plurality of input seismic data includes modeling with the seismic analysis system the plurality of multiple seismic events to estimate the plurality of multiple seismic events in the plurality of input seismic data; and subtracting with the seismic analysis system the estimated plurality of multiple seismic events from the plurality of input seismic data to generate a seismic difference image between the estimated plurality of multiple seismic events and the plurality of input seismic data.

In an aspect combinable with any of the previous aspects, performing the orthogonalization of the processed plurality of input seismic data includes performing, with the seismic analysis system, the orthogonalization of the seismic difference image to recover the at least one primary seismic event into the seismic image of the subterranean zone that excludes the portion of the plurality of multiple seismic events.

An aspect combinable with any of the previous aspects further includes controlling, with the seismic analysis system, the drilling geo-steering system to form a wellbore on the wellbore path toward the wellbore drilling target based on the seismic image of the subterranean zone.

In an aspect combinable with any of the previous aspects, controlling the drilling geo-steering system to form the wellbore on the wellbore path toward the wellbore drilling target based on the seismic image of the subterranean zone includes controlling the drilling geo-steering system to adjust the wellbore path toward the wellbore drilling target during drilling of the wellbore.

In an aspect combinable with any of the previous aspects, performing the orthogonalization of the processed plurality of input seismic data includes performing a signal-to-noise orthogonalization of the processed plurality of input seismic data.

In an aspect combinable with any of the previous aspects, the portion of the plurality of multiple seismic events includes all of the plurality of multiple seismic events.

In another general implementation, a seismic analysis system includes one or more memory modules that store a plurality of input seismic data associated with a subterranean zone that includes a wellbore drilling target. The input seismic data includes a plurality of primary seismic events and a plurality of multiple seismic events. The system further includes one or more hardware processors configured to execute instructions stored on the one or more memory modules to perform operations. The operations include processing the plurality of input seismic data to remove the plurality of multiple seismic events and at least one of the primary seismic events from the plurality of input seismic data. The operations include performing an orthogonalization of the processed plurality of input seismic data to recover the at least one primary seismic event into a seismic image of the subterranean zone that excludes at least a portion of the plurality of multiple seismic events. The operations include determining a wellbore path from a terranean surface toward the wellbore drilling target for a drilling geo-steering system based on the seismic image of the subterranean zone.

In an aspect combinable with the general implementation, the operation of processing the plurality of input seismic data to remove the plurality of multiple seismic events and at least one of the primary seismic events from the plurality of input seismic data includes modeling the plurality of multiple seismic events to estimate the plurality of multiple seismic events in the plurality of input seismic data; and subtracting the estimated plurality of multiple seismic events from the plurality of input seismic data to generate a seismic difference image between the estimated plurality of multiple seismic events and the plurality of input seismic data.

In an aspect combinable with any of the previous aspects, the operation of performing the orthogonalization of the processed plurality of input seismic data includes performing the orthogonalization of the seismic difference image to recover the at least one primary seismic event into the seismic image of the subterranean zone that excludes the portion of the plurality of multiple seismic events.

In an aspect combinable with any of the previous aspects, the one or more hardware processors are configured to execute instructions stored on the one or more memory modules to perform operations further including controlling the drilling geo-steering system to form a wellbore on the wellbore path toward the wellbore drilling target based on the seismic image of the subterranean zone.

In an aspect combinable with any of the previous aspects, the operation of controlling the drilling geo-steering system to form the wellbore on the wellbore path toward the wellbore drilling target based on the seismic image of the subterranean zone includes controlling the drilling geo-steering system to adjust the wellbore path toward the wellbore drilling target during drilling of the wellbore.

In an aspect combinable with any of the previous aspects, the operation of performing the orthogonalization of the processed plurality of input seismic data includes performing a signal-to-noise orthogonalization of the processed plurality of input seismic data.

In an aspect combinable with any of the previous aspects, the portion of the plurality of multiple seismic events includes all of the plurality of multiple seismic events.

In another general implementation, a wellbore system includes one or more seismic energy sources configured to generate seismic energy toward a subterranean formation that includes a wellbore drilling target; one or more seismic energy receivers configured to receive reflected seismic energy from the subterranean formation that includes a plurality of seismic energy primary events and a plurality of seismic energy multiple events; and a wellbore drilling system communicably coupled to the one or more seismic energy sources and the one or more seismic energy receivers. The wellbore drilling system is configured to perform operations including processing the reflected seismic energy to remove at least a portion of the seismic energy multiple events and at least one of the seismic energy primary events from the reflected seismic energy. The operations include performing an orthogonalization of the processed reflected seismic energy to recover the at least one seismic energy primary event into a seismic image of the subterranean formation that excludes the portion of the seismic energy multiple events; determining a wellbore path from a terranean surface toward the wellbore drilling target based on the seismic image of the subterranean formation. The operations include forming at least a portion of the wellbore path from the terranean surface toward the wellbore drilling target.

In an aspect combinable with the general implementation, the wellbore drilling system is configured to perform operations further including modeling the plurality of seismic energy multiple events to estimate the plurality of seismic energy multiple events in the processed reflected seismic energy; and subtracting the estimated seismic energy multiple events from the processed reflected seismic energy to generate a seismic difference image between the estimated seismic energy multiple events and the processed reflected seismic energy.

In an aspect combinable with any of the previous aspects, the operation of performing the orthogonalization of the processed reflected seismic energy includes performing the orthogonalization of the seismic difference image to recover the at least one seismic energy primary event into the seismic image of the subterranean formation that excludes the portion of the seismic energy multiple events.

In an aspect combinable with any of the previous aspects, the portion of the seismic energy multiple events includes all of the seismic energy multiple events.

In an aspect combinable with any of the previous aspects, the operation of forming the portion of the wellbore path from the terranean surface toward the wellbore drilling target is performed in real-time.

In an aspect combinable with any of the previous aspects, the plurality of seismic multiple events include seismic echoes or reverberations of the plurality of seismic energy primary events.

Implementations according to the present disclosure may include one or more of the following features. For example, implementations according to the present disclosure may recover primary seismic events using a signal and noise orthogonalization algorithm to recover primary energy that has been removed during a seismic data subtraction process. For example, improperly removed multiples (or unremoved multiples) for a data set during a seismic processing that determines drilling targets may generate false geological interpretations or fake drilling targets. Thus, an enhanced seismic image according to the present disclosure may provide for a more accurate geological interpretation and clearer drilling target image.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIG. 3 illustrates a signal to noise orthogonalization according to the present disclosure.

FIGS. 4A-4C show images of an input seismic data image, a demultipled image, and an image of the difference in the input and the demultipled images, respectively, according to the present disclosure.

DETAILED DESCRIPTION

Figure 1:
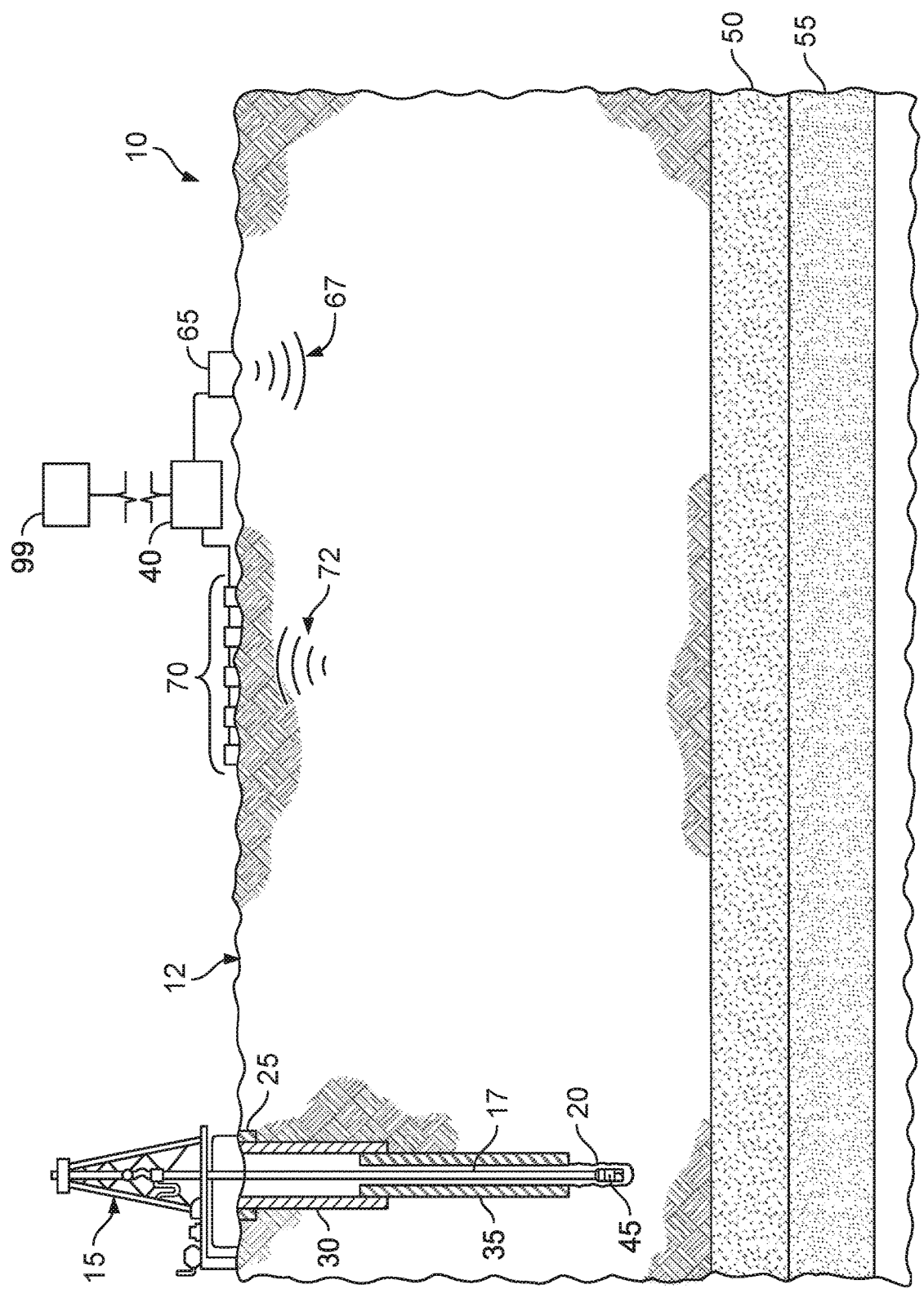
FIG. 1 illustrates an example implementation of a wellbore drilling system that includes a seismic analysis system communicably coupled to a drilling geo-steering system according to the present disclosure.

FIG. 1 illustrates an example implementation of a wellbore drilling system 10 that includes a seismic analysis system 40 communicably coupled to a drilling geo-steering system 99 of the wellbore drilling system 10. Generally, the seismic analysis system 40 may process one or more seismic signals, for example, acoustic signals reflected from one or more subterranean formations under a terranean surface, and process such signals to provide an accurate seismic image of the one or more subterranean formations. The seismic image may then be used to geo-steer a drilling system to produce a wellbore that reaches a target depth and location in the one or more subterranean zones.

For example, in some aspects, the seismic analysis system 40 may identify or receive seismic signal data and process the data to retrieve a primary signal during seismic multiple subtraction using an orthogonalization step in the process. For example, the seismic analysis system 40 may process a conventional demultiple workflow and then apply a local weighting operator to the obtained demultiple section and the corresponding difference between the input data and the demultiple section. This operation retrieves the primary signal leakage-energy present in the difference and further enhances the demultiple section.

Seismic multiple modeling techniques, such as three dimensional (3D) surface related multiple elimination (SRME) and 3D interbed multiple prediction algorithms are conventionally used to enhance seismic images. Such conventional techniques may not produce the most accurate seismic image due to the multiple subtraction process, which consists of two steps. The first step consists of modeling the multiple event (for example, a seismic echo or reverberation of a primary seismic event) using one of several potential techniques. The second step consists of subtracting the estimated multiples from the input data consisting of both primaries and multiples. Such subtraction may rely on algorithms, such as, for example, least squares subtraction or curvelet-domain subtraction. During the subtraction processes, part of the primary events are often removed, particularly when the primary and multiple events are close to each other or the events overlap and exhibit similar curvature. When useful primary events are removed from the data, image degradation and inaccurate seismic interpretation. In some aspects, as described more fully in the present disclosure, the orthogonalization step recaptures these removed primary events to provide a more accurate seismic image, thereby, for example, more accurately providing geo-steering data to the wellbore drilling system 10.

As shown, the wellbore drilling system 10 accesses one or more subterranean formations to produce hydrocarbons located in such subterranean formations. As illustrated in FIG. 1, the wellbore drilling system 10 includes a drilling assembly 15 deployed on a terranean surface 12. The drilling assembly 15 may be used to form a wellbore portion 20 extending from the terranean surface 12 and through one or more geological formations in the Earth. One or more subterranean formations 50 and 55 are located under the terranean surface 12. As will be explained in more detail, one or more wellbore casings, such as a surface casing 30 and intermediate casing 35, may be installed in at least a portion of the vertical wellbore portion 20.

In some embodiments, the drilling assembly 15 may be deployed on a body of water rather than the terranean surface 12. For instance, in some embodiments, the terranean surface 12 may be below an ocean, gulf, sea, or any other body of water under which hydrocarbon-bearing formations may be found. In short, reference to the terranean surface 12 includes both land and underwater surfaces and contemplates forming or developing one or more wellbores from either or both locations.

Generally, the drilling assembly 15 may be any appropriate assembly or drilling rig used to form wellbores or boreholes in the Earth. The drilling assembly 15 may use traditional techniques to form such wellbores, such as the wellbore portion 20, or may use nontraditional or novel techniques. In some embodiments, the drilling assembly 15 may use rotary drilling equipment to form such wellbores. Rotary drilling equipment is known and may consist of a drill string 17 and a bottom hole assembly 45. In some embodiments, the drilling assembly 15 may consist of a rotary drilling rig. Rotating equipment on such a rotary drilling rig may consist of components that serve to rotate a drill bit, which in turn forms a wellbore, such as the vertical wellbore portion 20, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 17. The drill string 17 is typically attached to the drill bit within the bottom hole assembly 45. A swivel, which is attached to hoisting equipment, carries much, if not all of, the weight of the drill string 17, but may allow it to rotate freely.

The drill string 17 typically consists of sections of heavy steel pipe, which are threaded so that they can interlock together. Downhole of the drill pipe are one or more drill collars, which are heavier, thicker, and stronger than the drill pipe. The threaded drill collars help to add weight to the drill string 17 uphole of the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 45, which is located at a downhole end of the drill string 17. The drill bit is primarily responsible for making contact with the material (for example, rock) within the one or more geological formations and drilling through such material. According to the present disclosure, a drill bit type may be chosen depending on the type of geological formation encountered while drilling. The circulating system of a rotary drilling operation, such as the drilling assembly 15, may be an additional component of the drilling assembly 15. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. In some embodiments, such as, for example, during a horizontal or directional drilling process, downhole motors may be used in conjunction with or in the bottom hole assembly 45. Such a downhole motor may be a mud motor with a turbine arrangement, or a progressive cavity arrangement, such as a Moineau motor. These motors receive the drilling fluid through the drill string 17 and rotate to drive the drill bit or change directions in the drilling operation.

As illustrated in FIG. 1, the bottom hole assembly 45, including the drill bit, drills or creates the vertical wellbore portion 20, which extends from the terranean surface 12 towards the subterranean formations 50 and 55. In some embodiments of the wellbore drilling system 10, the vertical wellbore portion 20 may be cased with one or more casings. As illustrated, the vertical wellbore portion 20 includes a conductor casing 25, which extends from the terranean surface 12 shortly into the Earth. A portion of the vertical wellbore portion 20 enclosed by the conductor casing 25 may be a large diameter borehole. Downhole of the conductor casing 25 may be the surface casing 30. The surface casing 30 may enclose a slightly smaller borehole and protect the vertical wellbore portion 20 from intrusion of, for example, freshwater aquifers located near the terranean surface 12.

Although illustrated as vertical, the wellbore portion 20 may be offset from vertical (for example, a slant wellbore), a directional wellbore, a horizontal wellbore, or combinations of several of these types of wellbore. For example, the wellbore portion 20 may be a stepped wellbore, such that a portion is drilled vertically downward and then curved to a horizontal wellbore portion. The horizontal wellbore portion may then be turned downward to a second substantially vertical portion, which is then turned to a second substantially horizontal wellbore portion. Additional vertical and horizontal wellbore portions may be added according to, for example, the type of terranean surface 12, the depth of one or more target subterranean formations, or the depth of one or more productive subterranean formations, or a combination of both.

The drilling assembly 15, generally, may be controlled (for example, by a directional drilling operator) with geo-steering control system 99. Generally, the geo-steering control system 99 may be used or operated to control a direction (in three-dimensions) of the BHA 45, and thus the drill bit, as it forms the wellbore portion 20, particularly as a directional wellbore. As shown in the example implementation of FIG. 1, the geo-steering control system 99 is communicably coupled to the seismic analysis system 40. Thus, in some aspects, the seismic analysis system 40 may, in real-time, provide data to the geo-steering control system 99 to control a direction (for example, in three dimensions) of the BHA 45. In some aspects, "real-time," means while the BHA 45 is being controlled (by geo-steering control system 99) to form the wellbore 20.

The illustrated seismic analysis system 40 is coupled to one or more seismic energy receivers 70 (for example, geophones) and at least one seismic energy source 65. In some aspects, the seismic energy source 65 may be an explosive device, a thumper truck, a seismic vibrator (for instance, a Vibroseis device), or other surface (or subterranean) based device that generates seismic energy used to perform seismic surveys. For example, as shown, the seismic energy source 65 generates seismic energy 67 from the terranean surface 12 toward the subterranean zones 50 and 55. Reflected seismic energy 72 is received at the seismic receivers 70. The reflected seismic energy 72, in some aspects, is seismic energy 67 that reflects off of geologic formations (for example, layers, inconsistencies) in the subterranean zones 50 and 55 and between the terranean surface 12 and the zones 50 and 55. The illustrated seismic analysis system 40, therefore, acts as a seismic energy receiving or recording system that receives (and then processes) seismic data in the form of the reflected seismic energy 72 that is generated by the seismic energy 67 generated by the seismic energy source 65.

Figure 2:
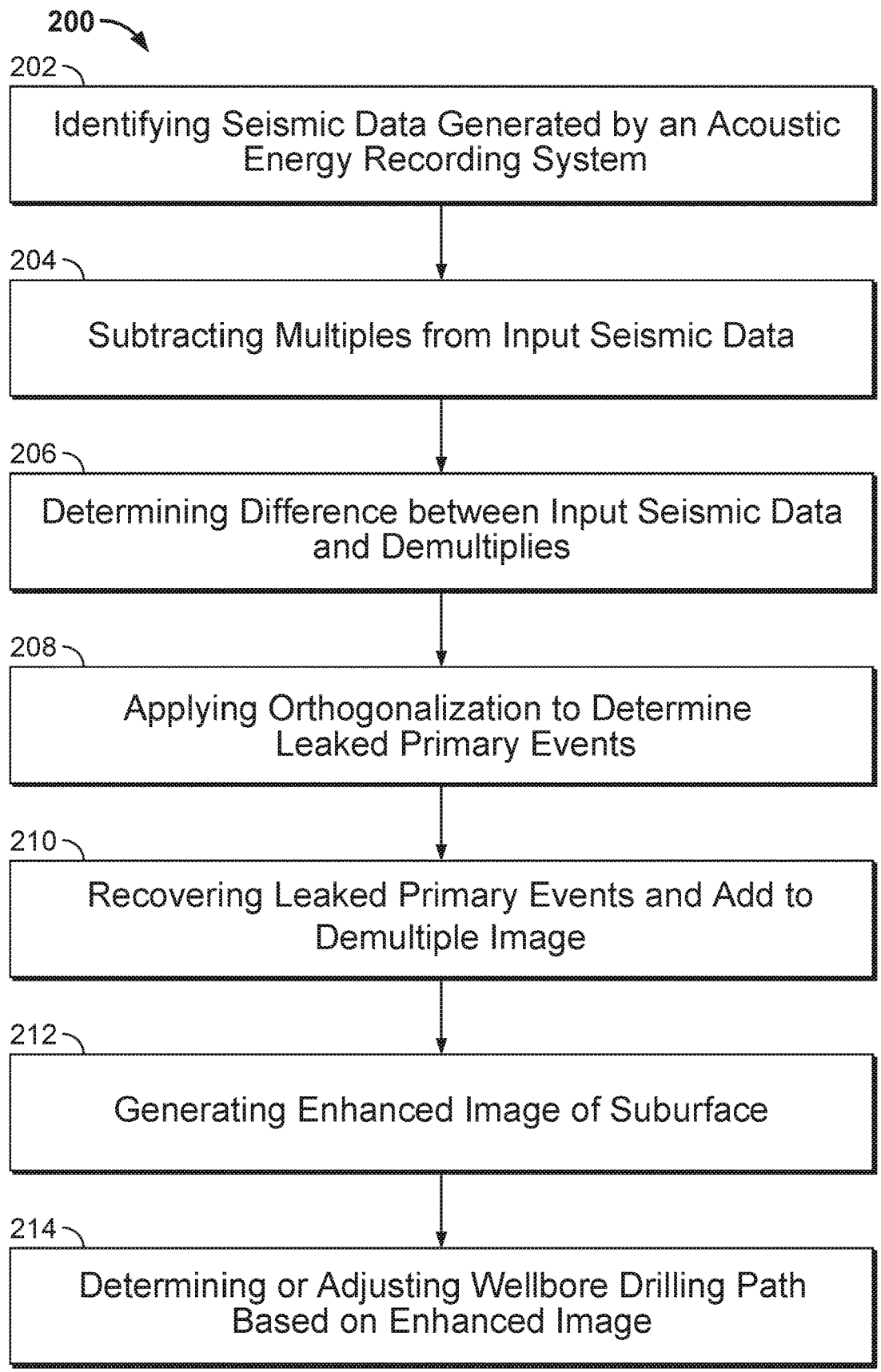
FIG. 2 is a flowchart that describes an example method for processing seismic data to control a drilling geo-steering system according to the present disclosure.

FIG. 2 is a flowchart that describes an example method 200 for processing seismic data to control the drilling geo-steering control system 99. For example, in some aspects, method 200 may be executed by or with the seismic analysis system 40 in combination with (or independent of) the geo-steering control system 99. Method 200 may begin at step 202, which includes identifying seismic data generated by a seismic energy recording system. For example, seismic analysis system 40 may receive and identify seismic data in the form of the reflected seismic energy 72 after operation of the seismic energy source 65 to generate seismic energy 67. The seismic energy 67 reflects (or refracts, or both) from the subterranean zones 50 and 55. Generally, the seismic data identified in step 202 is shown in FIG. 4A, which shows input seismic data image 400. The input seismic data image 400 includes both primary events and multiples (for example, of the primary events) in the image 400. Thus, the input seismic data image 400 may not accurately reflect (due to the multiples) the seismic image of the subterranean formation in zones 50 or 55 or both.

In some aspects, use of the input seismic data image 400 is one of many techniques in identifying the seismic data in step 202. For example, in some aspects, in order to estimate or identify the multiple events in the identified seismic data in step 202, a multiple data model is generated by the input seismic data image 400 or other techniques, such as estimated from a statistical approach (for example, from the raw seismic data), using a stacking (for example, root mean squared (RMS)) velocity model (such as in Radon applications), or by conducting forward modelling via a ray tracing or a wave equation based algorithm.

Thus, generating the multiple data model may be done through a data-driven technique, or a model-driven technique. In the data-driven case, for example, the terranean surface 12 (in the case of surface related multiples) is first selected. Alternatively, in the case of an internal multiple generator, a phantom horizon (or multiple horizons) is first selected. For surface multiple prediction, a data auto-convolution is performed in order to estimate the multiple model. For the case of an internal multiple model prediction, the data are separated into two parts: 1) data above the phantom horizon, and 2) data below the phantom horizon. The multiples are then modeled by applying a convolution process on the two data sets followed by a cross-correlation process without requiring any velocity model. However, in the case of model-driven technique, the multiple prediction uses a velocity—depth model in addition to the input data to predict the multiples.

Method 200 may continue at step 204, which includes subtracting multiples from input seismic data (for example, using a known or conventional algorithm). For example, FIG. 4B shows a demultiple image 405 that represents the demultiple section of the input seismic data image 400 after application of a seismic adaptive subtraction process (in other words, to subtract the multiples) has been applied to the image 400. For example, once the multiple model is estimated by one of the data-driven or model-driven techniques during step 202, step 204 includes subtracting the multiples from the input seismic data. In some aspects, the subtraction is performed by a least squares subtraction algorithm. In such aspects, direct subtraction of the two datasets (input data—multiple model) may not produce accurate results as the characteristics (for instance, the phase and amplitude) of the two data sets are different. In some aspects, a matching filter is applied to first cross-equalize the characteristics of the two data sets and then the subtraction is performed using the least squares algorithm by minimizing the errors. Such a technique is referred to as "adaptive multiple subtraction" and may adaptively subtract the modeled multiples (surface or internal generated) from the input seismic data.

In some aspects, the choice of parameters during the subtraction process allows a choice of effectiveness of the multiple subtraction. A shorter window length for the matching allows removal of more multiples but also damages the primary event data. Conversely, larger window lengths allows less removal of multiples (but keeps more primary event data). In some aspects, shorter window lengths are preferred as the orthogonalization step in method 200 (step 208) restores the primary events that were removed in step 204.

Figure 5A:
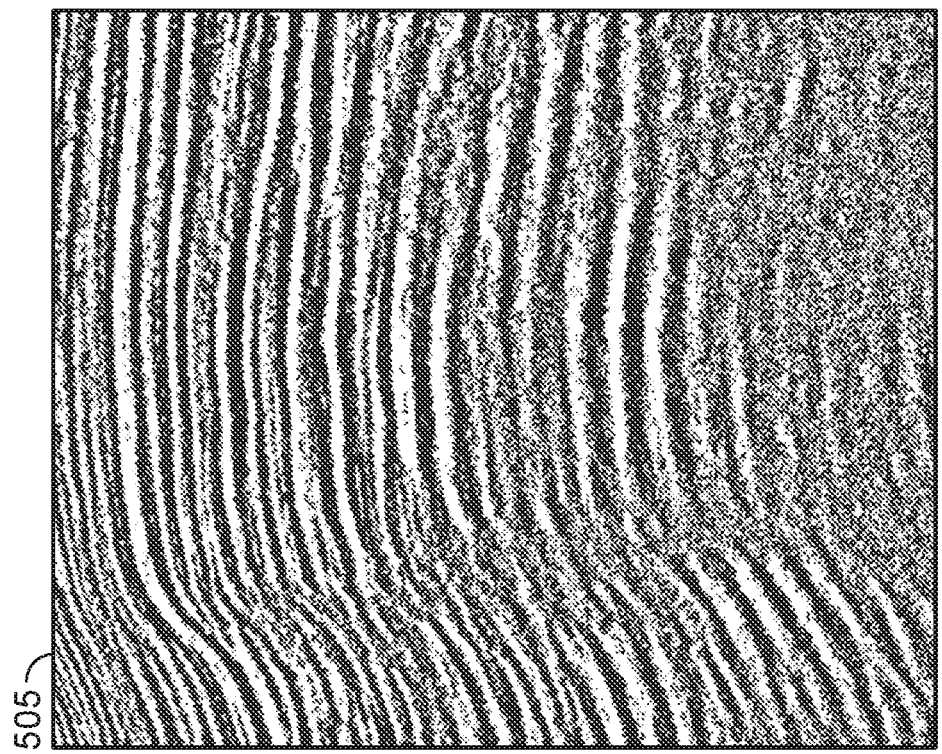
FIGS. 5A-5B show images of the processed seismic data after a demultiple step of the process and after an orthogonalization step of the process, respectively, according to the present disclosure.

Method 200 may continue at step 206, which includes determining a difference between input seismic data and demultiples. For example, as shown in FIG. 4C, a difference image 410 is shown that illustrates the differences in the input seismic data image 400 and the demultiple seismic data image 405. In some aspects, the difference image 410 shows an image in which the demultiple seismic data is subtracted from the input seismic data. Thus, the difference image 405 may not include multiple events, but, conventionally, also excludes some of the primary events that are removed during step 204. The image 500 shown in FIG. 5A also illustrates a representation of the difference in the input seismic data and the multiple seismic data events.

Method 200 may continue at step 208, which includes applying an orthogonalization to the leaked primary events. For example, in some aspects, step 208 includes a signal and noise orthogonalization algorithm to recover primary energy (in other words, primary events) that has been removed during the subtraction process of step 204. In some aspects, signal and noise orthogonalization for seismic de-noising retrieves leaked signals that have been removed during the de-noising (in other words, the subtraction step).

For example, FIG. 3 shows a schematic 300 of signal to noise orthogonalization. The schematic 300 shows an initial estimated signal 306, indicated as $s_0$. The schematic 300 also shows an initial estimated noise 304, indicated as $n_0$. The projection 308 of $n_0$ in the direction of $s_0$ is represented as $ws_0$. The schematic 300 also includes the final estimated noise 302, represented as $\hat{n}$. The final estimated signal ($\hat{s}$) 309 is therefore the sum of the initial estimated signal ($s_0$) 306 and the projection ($ws_0$) 308 as represented in the following equations:

$$\hat{n} = n_0 - ws_0, \text{ and} \qquad \text{Eq. 1}$$

$$\hat{s} = s_0 + ws_0, \qquad \text{Eq. 2}$$

where w is a weight derived using local correlation schemes from Eq. 3 along with a shaping regularization.

The weights (w) in Eqs. 1 and 2 may be derived using Local Orthogonalization Weights (LOW) from Eq. 3, where W(t) denotes the LOW for each time sample with local window length of m, and $s_o(t)$ and $n_o(t)$ are the initial estimated signal and noise for each sample point.

$$w(t) = \frac{\sum_{i=t-m/2}^{t+m/2} s_0(i) n_0(i)}{\sum_{i=t-m/2}^{t+m/2} s_0^2(i)}. \qquad \text{Eq. 3}$$

$$w = [\lambda^2 I + T(S_0^T S_0 - \lambda^2 I)]^{-1} \tau S_0^T n_0, \qquad \text{Eq. 4}$$

The weights may be obtained by solving the least-squares optimization equation (Eq. 4), where w is the LOW, I is the identity operator in the data space, $S_0$ is a diagonal matrix composed of the initial estimated signal. T is a triangle smoothing operator and $\lambda$ is scaling parameter, $\|S_O^T S_o\|_2$.

In step 208, the signal to noise orthogonalization is applied to the difference seismic image (image 410) to recover leaked primary events to obtain an enhanced image of the subterranean zones (for example, 50 and 55). For example, the orthogonalization restores leaked primary energy that has been removed during the demultiple step 204.

Figure 5B:
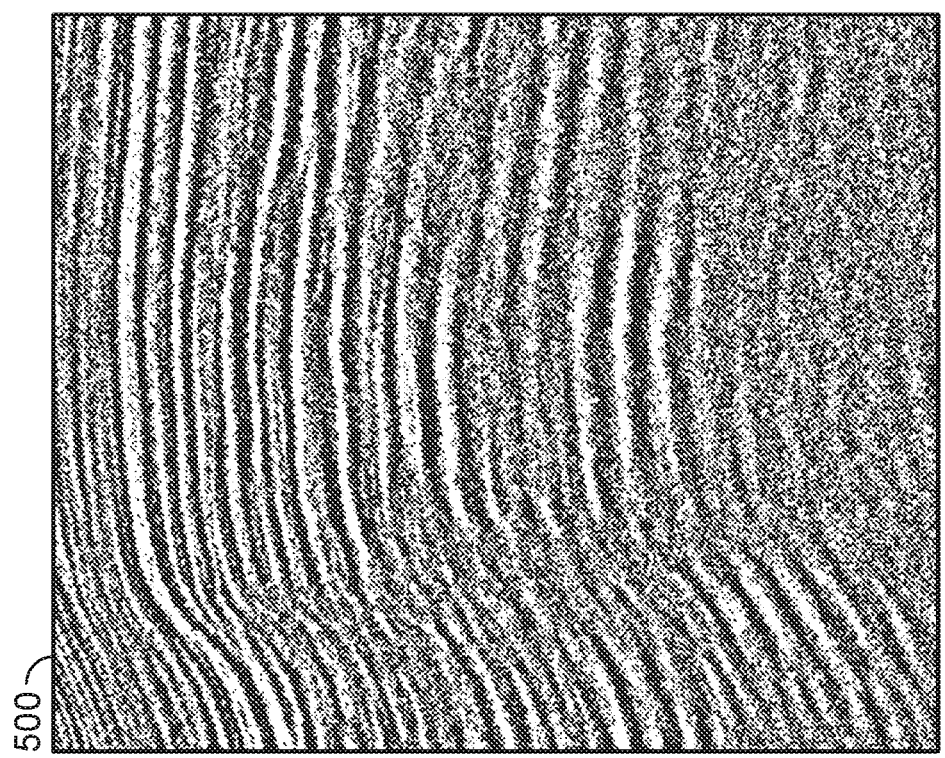
Figure 6B:
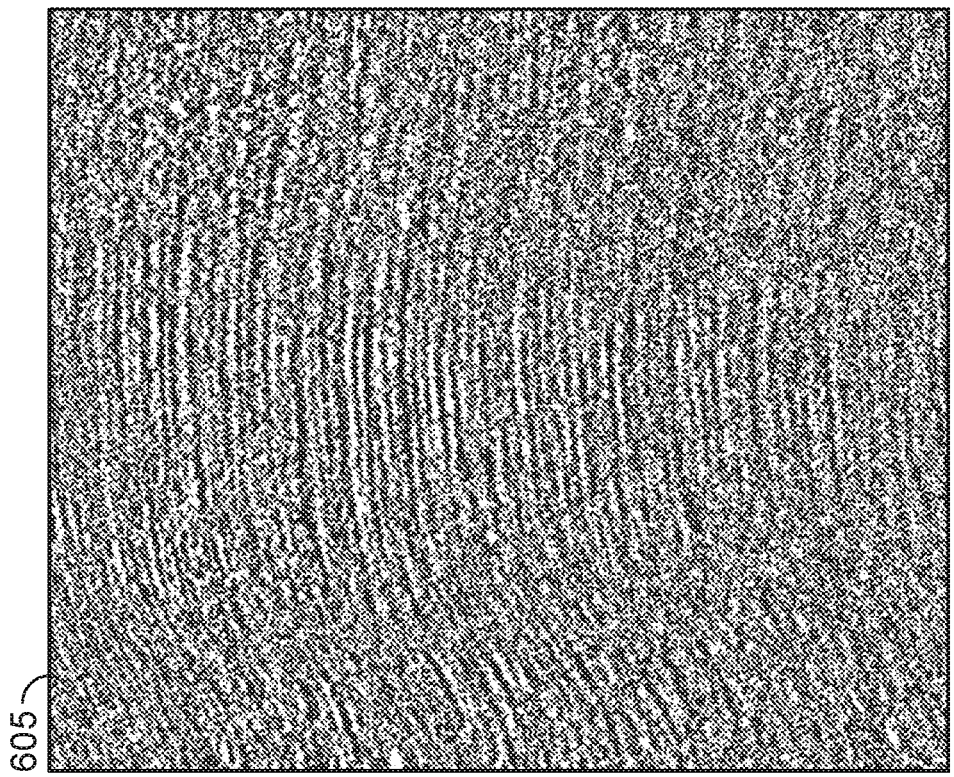
FIGS. 6A-6B show images of the difference in the input and the demultipled images without the orthogonalization step and with the orthogonalization step, respectively, according to the present disclosure.
Figure 6A:
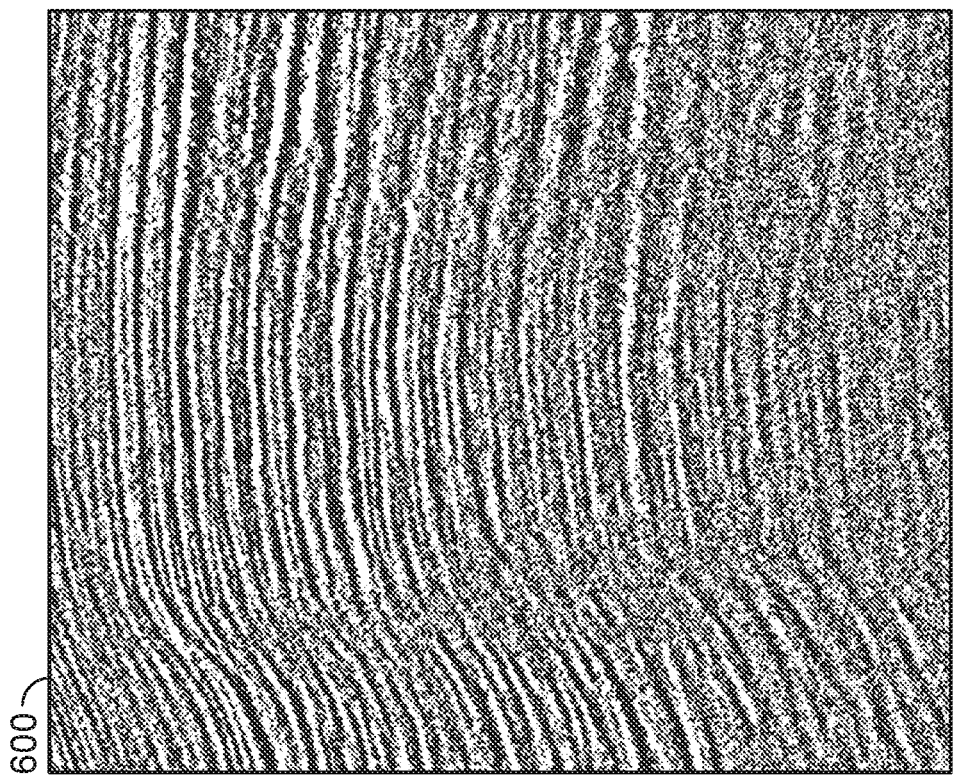

Method 200 may continue at step 210, which includes recovering the leaked primary events (for example, from orthogonalization) to add them to the demultiple image. For example, by applying the orthogonalization step 208 between the initial demultiple image (as shown in images 405 and 500) and the difference image (image 410 in FIG. 4C and image 600 in FIG. 6A) the primary events are recovered and a new difference image 505 in FIG. 5B is generated.

Method 200 may continue at step 212, which includes generating enhanced image of subsurface. For example, in a comparison of a difference image 600 shown in FIG. 6A after step 206 and a difference image 605 shown in FIG. 6B after step 210, the difference image 605 shows the unwanted multiple events characterized by higher frequency as the low frequency useful primary events have been removed and added back to the original demultiple image and ultimately generating the final enhanced and more accurate image 505 (for example, a more accurate image with some of the primary events restored). In image 600, some leaked primary event are clearly visible, which are characterized by lower frequencies. On the other hand, after the orthogonalization step 208, the image 605 shows multiple events, which are characterized by high frequencies.

Method 200 may continue at step 214, which includes determining or adjusting wellbore drilling path based on the enhanced image. For example, in some aspects, the seismic analysis system 40 that determines the enhanced seismic image of the subterranean zones 50 and 55 may transmit or otherwise expose the enhanced seismic image and seismic data to the geo-steering control system 99 during operation of the BHA 45 to form the wellbore 20. Based on the enhanced seismic image and data, the geo-steering control system 99 may adjust a planned drilling path of the wellbore 20 as the wellbore 20 is being formed, in other words, in real-time of the drilling operations. Alternatively, the enhanced seismic image and data may be used by the geo-steering control system 99 to generate a wellbore drilling plan prior to operation of the BHA 45 to form the wellbore 20.

Figure 7:
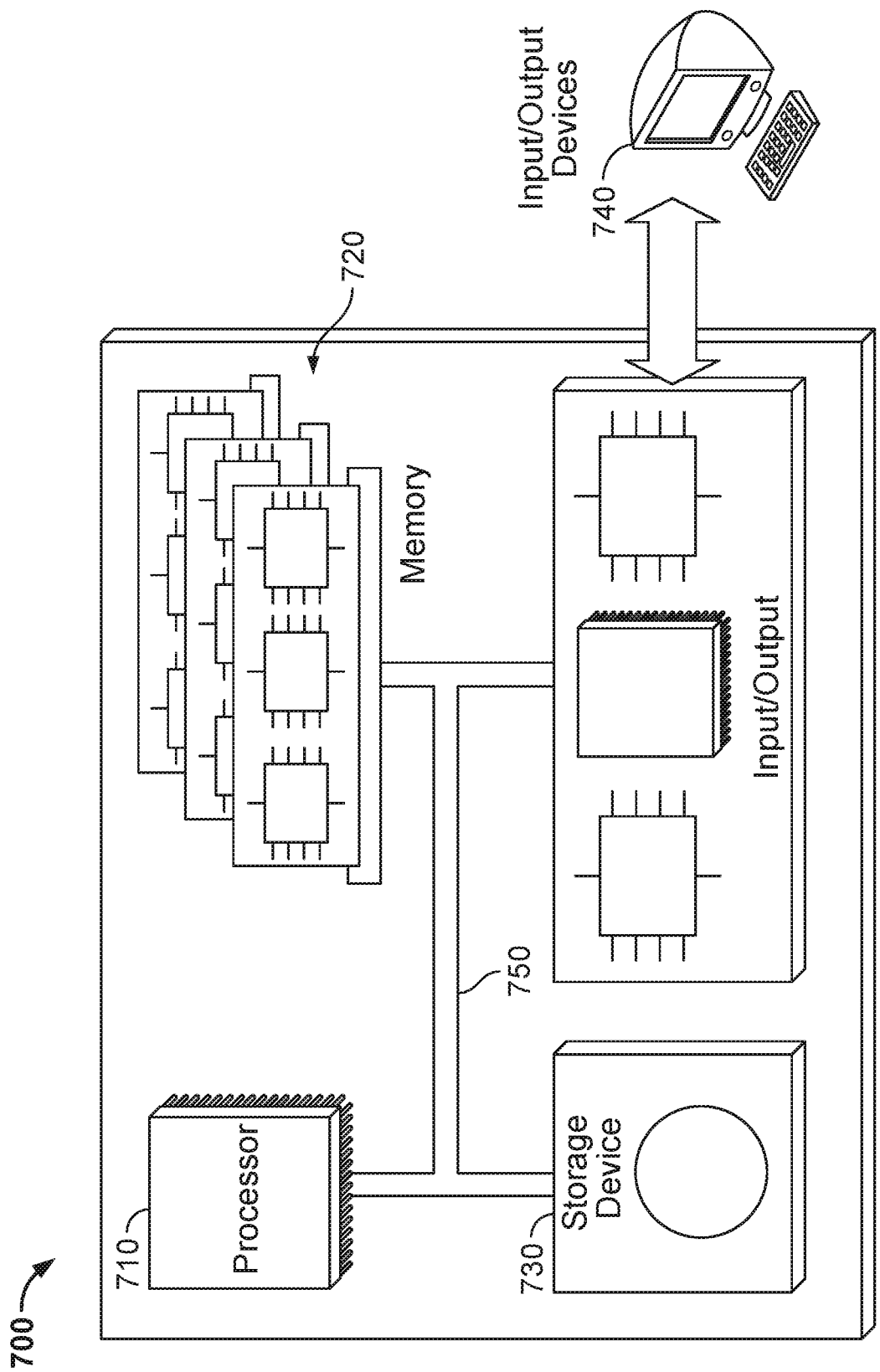
FIG. 7 illustrates a control system for all are parts of a seismic analysis system according to the present disclosure.

FIG. 7 illustrates a control system 700 for all are parts of a seismic analysis system, such as the seismic analysis system 40 shown in FIG. 1. The system 700 can be used for the operations described in association with any of the methods described previously (for example, method 200), for instance as or as part of the seismic analysis system 40, the geo-steering control system 99, or both. The system 700 is intended to include various forms of digital computers, such as laptops, desktops, workstations, personal digital assistants, servers, blade servers, or mainframes. The system 700 can also include mobile devices, such as personal digital assistants, cellular telephones, or smartphones. Additionally the system can include portable storage media, such as, Universal Serial Bus (USB) flash drives. For example, the USB flash drives may store operating systems and other applications. The USB flash drives can include input/output components, such as a wireless transmitter, or USB connector, that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/ output device 740 includes a keyboard or a pointing device (or both). In another implementation, the input/output device 740 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from. The at least one programmable processor can transmit data and instructions to, a data storage system, at least one input device, and at least one output device. A computer program is a set of instructions that can be used directly or indirectly in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), solid state drives (SSDs), and flash memory devices; magnetic disks such as internal hard disks and removable disks; magneto-optical disks; and CD-ROM and DVD-ROM disks. The processor and the memory can be supplemented by or incorporated in ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user. A keyboard and a pointing device such as a mouse or a trackball can be part of the computer by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication. such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for determining a wellbore drilling path, comprising:
    identifying, with a seismic analysis system, a plurality of input seismic data associated with a subterranean zone that comprises a wellbore drilling target, the input seismic data comprising a plurality of primary seismic events and a plurality of multiple seismic events;
    processing, with the seismic analysis system, the plurality of input seismic data to remove the plurality of multiple seismic events and at least one of the primary seismic events from the plurality of input seismic data, the processing comprising subtracting, with the seismic analysis system, an estimated plurality of multiple seismic events from the input seismic data to generate a demultiple image;
    subtracting, with the seismic analysis system, the demultiple image from the input seismic data to generate a difference image;

performing, with the seismic analysis system, an orthogonalization between the difference image and the demultiple image to recover the at least one primary seismic event into a seismic image of the subterranean zone that excludes at least a portion of the plurality of multiple seismic events; and determining, with the seismic analysis system, a wellbore path from a terranean surface toward the wellbore drilling target for a drilling geo-steering system based on the seismic image of the subterranean zone.

2. The computer-implemented method of claim 1, wherein processing the plurality of input seismic data to remove the plurality of multiple seismic events and at least one of the primary seismic events from the plurality of input seismic data comprises:

modeling, with the seismic analysis system, the plurality of multiple seismic events to estimate the plurality of multiple seismic events in the plurality of input seismic data.

3. The computer implemented method of claim 2, wherein performing the orthogonalization of the processed plurality of input seismic data comprises:

performing, with the seismic analysis system, the orthogonalization of the seismic difference image to recover the at least one primary seismic event into the seismic image of the subterranean zone that excludes the portion of the plurality of multiple seismic events.

4. The computer-implemented method of claim 1, further comprising:

controlling, with the seismic analysis system, the drilling geo-steering system to form a wellbore on the wellbore path toward the wellbore drilling target based on the seismic image of the subterranean zone.

5. The computer-implemented method of claim 4, wherein controlling the drilling geo-steering system to form the wellbore on the wellbore path toward the wellbore drilling target based on the seismic image of the subterranean zone comprises:

controlling the drilling geo-steering system to adjust the wellbore path toward the wellbore drilling target during drilling of the wellbore.

6. The computer-implemented method of claim 1, wherein performing the orthogonalization of the processed plurality of input seismic data comprises performing a signal-to-noise orthogonalization of the processed plurality of input seismic data.

7. The computer-implemented method of claim 1, wherein the portion of the plurality of multiple seismic events comprises all of the plurality of multiple seismic events.

8. A seismic analysis system, comprising:

one or more memory modules that store a plurality of input seismic data associated with a subterranean zone that comprises a wellbore drilling target, the input seismic data comprising a plurality of primary seismic events and a plurality of multiple seismic events; and one or more hardware processors configured to execute instructions stored on the one or more memory modules to perform operations comprising:

processing the plurality of input seismic data to remove the plurality of multiple seismic events and at least one of the primary seismic events from the plurality of input seismic data, the processing comprising subtracting, with the seismic analysis system, an estimated plurality of multiple seismic events from the input seismic data to generate a demultiple image;

subtracting, with the seismic analysis system, the demultiple image from the input seismic data to generate a difference image;

performing an orthogonalization between the difference image and the demultiple image to recover the at least one primary seismic event into a seismic image of the subterranean zone that excludes at least a portion of the plurality of multiple seismic events; and determining a wellbore path from a terranean surface toward the wellbore drilling target for a drilling geo-steering system based on the seismic image of the subterranean zone.

9. The seismic analysis system of claim 8, wherein the operation of processing the plurality of input seismic data to remove the plurality of multiple seismic events and at least one of the primary seismic events from the plurality of input seismic data comprises:

modeling the plurality of multiple seismic events to estimate the plurality of multiple seismic events in the plurality of input seismic data.

10. The seismic analysis system of claim 9, wherein the operation of performing the orthogonalization of the processed plurality of input seismic data comprises:

performing the orthogonalization of the seismic difference image to recover the at least one primary seismic event into the seismic image of the subterranean zone that excludes the portion of the plurality of multiple seismic events.

11. The seismic analysis system of claim 8, wherein the one or more hardware processors are configured to execute instructions stored on the one or more memory modules to perform operations further comprising:

controlling the drilling geo-steering system to form a wellbore on the wellbore path toward the wellbore drilling target based on the seismic image of the subterranean zone.

12. The seismic analysis system of claim 11, wherein the operation of controlling the drilling geo-steering system to form the wellbore on the wellbore path toward the wellbore drilling target based on the seismic image of the subterranean zone comprises:

controlling the drilling geo-steering system to adjust the wellbore path toward the wellbore drilling target during drilling of the wellbore.

13. The seismic analysis system of claim 8, wherein the operation of performing the orthogonalization of the processed plurality of input seismic data comprises performing a signal-to-noise orthogonalization of the processed plurality of input seismic data.

14. The seismic analysis system of claim 8, wherein the portion of the plurality of multiple seismic events comprises all of the plurality of multiple seismic events.

15. A wellbore system, comprising:

one or more seismic energy sources configured to generate seismic energy toward a subterranean formation that comprises a wellbore drilling target;

one or more seismic energy receivers configured to receive reflected seismic energy from the subterranean formation, the reflected seismic energy comprising a plurality of seismic energy primary events and a plurality of seismic energy multiple events;

a wellbore drilling system communicably coupled to the one or more seismic energy sources and the one or more seismic energy receivers and configured to perform operations comprising:

processing the reflected seismic energy to remove at least a portion of the seismic energy multiple events and at least one of the seismic energy primary events from the reflected seismic energy, the processing comprising subtracting, with the seismic analysis system, an estimated plurality of multiple seismic events from the input seismic data to generate a demultiple image;

subtracting, with the seismic analysis system, the demultiple image from the input seismic data to generate a difference image;

performing an orthogonalization between the difference image and the demultiple image to recover the at least one seismic energy primary event into a seismic image of the subterranean formation that excludes the portion of the seismic energy multiple events;

determining a wellbore path from a terranean surface toward the wellbore drilling target based on the seismic image of the subterranean formation; and forming at least a portion of the wellbore path from the terranean surface toward the wellbore drilling target.

16. The wellbore drilling system of claim 15, wherein the wellbore drilling system is configured to perform operations further comprising:

modeling the plurality of seismic energy multiple events to estimate the plurality of seismic energy multiple events in the processed reflected seismic energy.

17. The wellbore drilling system of claim 16, wherein the operation of performing the orthogonalization of the processed reflected seismic energy comprises:

performing the orthogonalization of the seismic difference image to recover the at least one seismic energy primary event into the seismic image of the subterranean formation that excludes the portion of the seismic energy multiple events.

18. The wellbore drilling system of claim 17, wherein the portion of the seismic energy multiple events comprises all of the seismic energy multiple events.

19. The wellbore drilling system of claim 15, wherein the operation of forming the portion of the wellbore path from the terranean surface toward the wellbore drilling target is performed in real-time.

20. The wellbore drilling system of claim 15, wherein the plurality of seismic multiple events comprise seismic echoes or reverberations of the plurality of seismic energy primary events.

* * * * *